United States Patent
Hayashi et al.

[11] Patent Number: 6,005,712
[45] Date of Patent: *Dec. 21, 1999

[54] ZOOM VIEWFINDER SYSTEM FOR SINGLE REFLEX CAMERA

[75] Inventors: Kohtaro Hayashi, Toyonaka; Yoshinobu Kudo; Hiromu Mukai, both of Kawachinagano; Makoto Ando, Sakai; Ken Tanino, Kobe; Akira Funahashi; Hirokazu Yagura, both of Sakai, all of Japan

[73] Assignee: Minolta Co., Ltd., Osaka, Japan

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/655,488

[22] Filed: May 30, 1996

Related U.S. Application Data

[63] Continuation-in-part of application No. 08/416,495, Apr. 4, 1995, Pat. No. 5,585,965, which is a continuation of application No. 07/960,581, Oct. 13, 1992, abandoned.

[30] Foreign Application Priority Data

Oct. 16, 1991 [JP] Japan ..................................... 3-298528
Oct. 16, 1991 [JP] Japan ..................................... 3-298530

[51] Int. Cl.⁶ ............................. G02B 23/00; G02B 13/10
[52] U.S. Cl. ......................... 359/431; 359/422; 396/377; 396/386

[58] Field of Search .................................. 359/420–422, 359/431–432, 362, 808, 809, 811, 815, 399, 819–822; 396/373–386, 25–27, 535, 529

[56] References Cited

U.S. PATENT DOCUMENTS

| | | | |
|---|---|---|---|
| 4,024,554 | 5/1977 | Hayami | 396/535 |
| 4,171,888 | 10/1979 | Shono et al. | 396/386 |
| 4,615,590 | 10/1986 | Alvarez et al. | 396/529 |
| 4,910,545 | 3/1990 | Fujibayashi et al. | 396/384 |
| 4,955,715 | 9/1990 | Kitagishi | 396/385 |
| 4,999,658 | 3/1991 | Kamitani et al. | 396/385 |
| 5,363,163 | 11/1994 | Hayashi et al. | 396/386 |
| 5,585,965 | 12/1996 | Hayashi et al. | 359/431 |

*Primary Examiner*—Thong Nguyen
*Attorney, Agent, or Firm*—Price Gess & Ubell

[57] ABSTRACT

A viewfinding system for use with an optical system that creates a first object image includes an objective block which is sealed as a unit. The objective block includes a focusing screen for forming the first object image and relay optics for transmitting the first object image. A zoom block includes a zoom optical system for providing a modification of the magnification of the first object image to provide a second object image. An eyepiece block receives the second object image and includes a reflecting member and an eyepiece through which the second object image is observed. The eyepiece block is sealed and the second object image is realized within the sealed eyepiece block.

8 Claims, 19 Drawing Sheets

PANORAMA

ZOOM VIEWFINDER SYSTEM FOR SINGLE REFLEX CAMERA

This is a continuation-in-part application of U.S. Ser. No. 08/416,495, filed on Apr. 4, 1995, now U.S. Pat. No. 5,585,965 which is a continuation of U.S. Ser. No. 07/960,581, filed on Oct. 13, 1992 (abandoned).

BACKGROUND OF THE INVENTION

1. Field of the Invention

The present invention relates to a relay type zoom viewfinder system for a single reflex camera capable of trimming or panoramic photographing.

2. Description of the Prior Art

Recently, a trimming system applied to a camera is provided. In this system, a predetermined area A of an image forming area B of a film 141 shown in FIG. 14(A), for example, can be enlarged in printing to an area A' of a photographic paper 143 shown in FIG. 14(B) by recording information of the area A on a predetermined place 142 of an emulsion surface of the film 141.

That is to say, in a trimming mode, trimming information is recorded on the predetermined place 142 of the film 141, and a reading device reads the information in printing. Then, in accordance with the information, a printing system enlarges the area A by zooming.

The zooming operation performed according to the trimming information is called "electronic zooming (EZ)" or "pseudo zooming". A ratio of the length of a diagonal of an area determined according to the EZ to the length of a diagonal of a film is called a trimming magnification.

A panoramic photographing system is also provided as well the trimming system. In the trimming system, a photographing area is enlarged at the same aspect ratio as in a regular system. However, in the panoramic photographing system, the aspect ratio is not same. Namely, in the panoramic photographing system, a photographing area C does not include the upper and lower parts of the film as shown in FIG. 14(A), so that a printed picture is more oblong than in the regular system when the photographing area C is enlarged. Panoramic photographing information is recorded on the predetermined place 142 of the film as well as the above described trimming information.

As a TTL viewfinder system which can be applied to the trimming system, one observed through an eyepiece optical system and a relay zoom optical system is considered. In the TTL viewfinder system like this, a frame limit member does not need to be moved in accordance with a pseudo zooming operation, and the zooming ratio can be easily high. These are merits of the above mentioned TTL viewfinder system. However, in order to obtain a good finder image in the relay zoom optical system, the length from a first image plane to a second image plane has to be long. When the length is long, a viewfinder becomes big.

A viewfinder system which is made as small as possible as a whole by refracting a light bundle from the first image plane to the second image plane with mirrors is conventionally known. (Japanese Laid-Open Patent Applications No. Sho 64-68739, No. Hei 1-103071, No. Hei 1-231013, No. Hei 2-120833 and No. Hei 2-120834 and Japanese Laid-Open Utility Model No. Hei 2-3530)

Nevertheless, though a light bundle from the first image plane to the second image plane is refracted by mirrors, the length of an optical path of a relay zoom optical system is long. Therefore, plural reflecting members such as a mirror is needed so as to make a viewfinder system small. The more the reflecting members are used, the more the manufacturing process becomes complicated. Then, the optical axis is deviated. It causes a problem that a range observed through a viewfinder system is out of a photographing range.

As a zoom viewfinder system for a common single reflex camera, which can be applied to the trimming system, one in which a relay zoom optical system and an eyepiece optical system are fixed in a holder and a zooming operation is carried out by shifting a part of the relay zoom optical system is considered.

However, in this structure, reflecting members for reflecting a light path must be fixed in the holder with the relay zoom optical system so that the viewfinder system should be applied to a single reflex camera. The purpose of reflecting the light path with the reflecting members is to prevent the camera body from being big by making the finder optical system as small as possible. Then, the above structure has problems.

For example, the complicated structure of the holder makes the manufacture of the holder difficult. Moreover, when the structure of the holder becomes complicated, it becomes harder to fix the relay zoom optical system and the reflecting members to the holder, and that causes the difficulty of keeping the zooming precision high. Thus, in the above described structure, not only manufacturing and maintaining the viewfinder system are difficult, but also the zooming precision is low.

In addition, when a part of the relay zoom optical system are shifted by a driving system for a zooming operation, unnecessary power is transmitted to all parts of the holder directly, and as a result, a distortion of the holder occurs, and the optical axis is shifted.

The length of an optical path of a viewfinder system including a relay zoom optical system is longer than that of a viewfinder system using a penta-prism, so that reflecting members are provided in the relay type zoom viewfinder system in order to make the viewfinder system small. For example, a relay type zoom viewfinder system using Porro-mirrors as reflecting members is known. In this viewfinder system, a Porro-mirror is composed of two flat mirrors held in one with a holding member so that an angle between the two mirrors should be 90°.

A reflecting member such as a Porro-mirror, whose two reflecting surfaces are formed with a mold of glass or plastic, can be formed with high precision in relative positions of the two reflecting surfaces. However, different from the case of a pentaprism, in the case of such a reflecting member, convergent rays do not pass through a medium such as glass and plastic provided between two parallel reflecting surfaces. Therefore, the optical light path becomes long, so that a viewfinder system becomes big in size. Thus, the reflecting member such as a Porro-mirror is not suitable for a viewfinder which uses an optical system such as a relay optical system, that is, a viewfinder where an extremely long light path must be included. Furthermore, even if the relative positions of the two reflecting members can be determined precisely, an error of the fitting positions of the reflecting members owing to an error in fitting holding members and such causes a deviation of the light axis. As a result, an area observed through a viewfinder system does not correspond with an area to be photographed practically.

SUMMARY OF THE INVENTION

An object of the present invention is to provide a viewfinder system which is small in size so as to make a camera body small by preventing the optical path from defining the arrangement of other comprising members in the camera body.

Another object of the present invention is, in a relay type zoom TTL viewfinder system including reflecting members, to provide adjusting means for slightly changing an incident angle of the light bundle on a reflecting member in order to prevent a deviation of the optical axis from causing a difference between an area observed through a viewfinder system and a photographing area.

It is further object of the present invention to provide a zoom viewfinder system for a single reflex camera, whose zooming precision is high because of easy assembly and maintenance of a zoom optical system and which is capable of preventing a distortion of a holder and a deviation of the optical axis which are caused by driving a zoom relay lens.

It is yet another object of the present invention to provide a small viewfinder system which has high precision in positioning two reflecting members relatively and which can prevent the optical axis from deviating even if a holding member deviates as a whole because of an error in fixing.

Other objects and advantages of the present invention will become apparent from the detailed description to follow taken in conjunction with the appended claims.

A viewfinder system of an optical device of the present invention comprises: reflecting members disposed in an optical path in said optical device to reflect light rays traveling in said optical path, two of said reflecting members located parallel to each other; and holding means for holding said two of reflecting members to maintain said parallel relationship.

A viewfinder system of an optical device of the present invention further comprises: an optical system consisting of plural parts disposed in an optical path; a first holding member for holding a first part of said optical system; a second holding member for holding a second part of said optical system; and first fixing means for fixing said first and second holding members.

A viewfinder system of an optical device of the present invention yet further comprises: a focusing screen on which a first object image is formed; a relay optical system through which said first object image is formed as a second object image and where said second object image is formed smaller than said first object image; reflecting members disposed in said relay optical system to reflect light rays of said first object image; and means for moving one of said reflecting members except a reflecting member which is provided closest to said first object image, so as to adjust an angle of said light rays of said first object image to said reflecting members.

A viewfinding system for use with an optical system that creates a first object image includes an objective block which is sealed as a unit. The objective block includes a focusing screen for forming the first object image and relay optics for transmitting the first object image. A zoom block includes a zoom optical system for providing a modification of the magnification of the first object image to provide a second object image. An eyepiece block receives the second object image and includes a reflecting member and an eyepiece through which the second object image is observed. The eyepiece block is sealed and the second object image is realized within the sealed eyepiece block.

DETAILED DESCRIPTION OF THE PREFERRED EMBODIMENT

The above described objects are achieved in the present invention by providing a viewfinder system Embodiments of the present invention are described with reference to the accompanying drawings.

Figure 2:
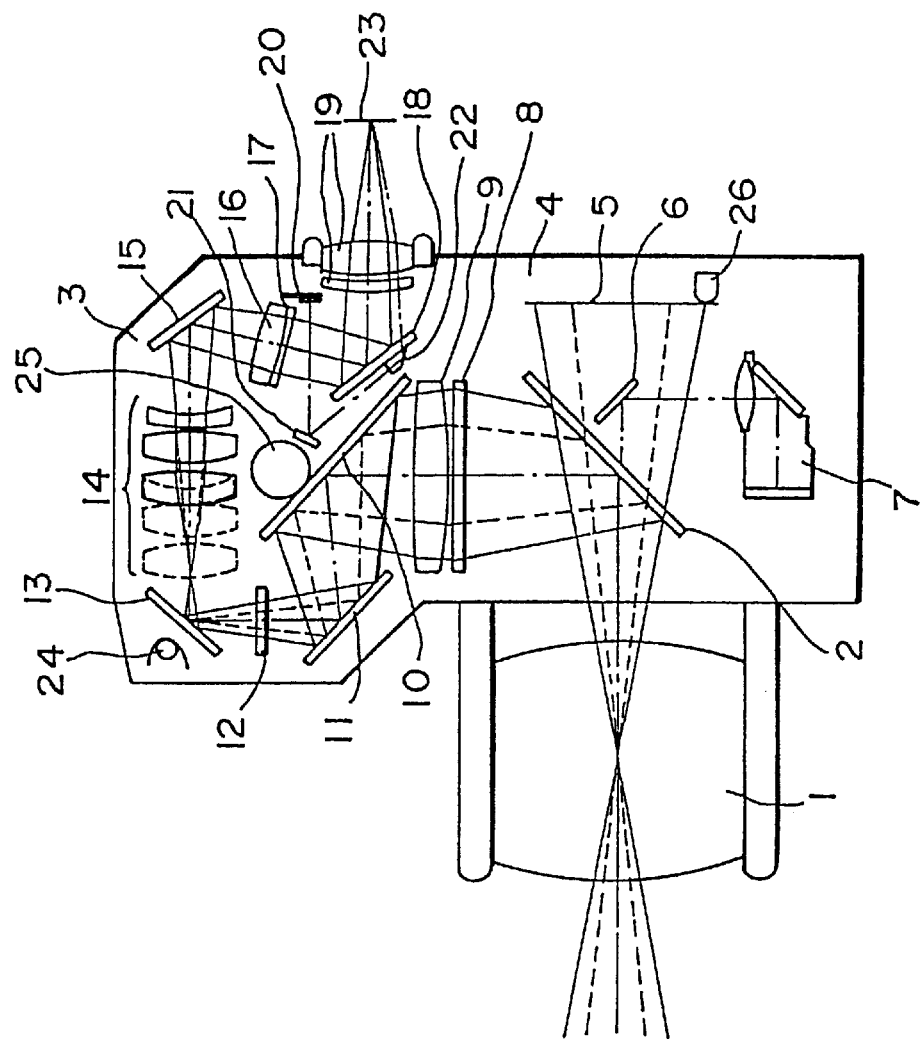
FIG. 2 is an illustration showing a viewfinder system of an embodiment of the present invention which is applied to a single reflex camera.

FIG. 2 shows a schematic structure of a camera having a viewfinder system of the present invention. In FIG. 2, 1 denotes a photographing lens usually detachable from a camera body 4. 2 denotes a main mirror which leads a light bundle passed through the photographing lens 1 to a finder optical system 3 provided thereabove and which is provided in the camera body 4. 5 denotes a film and 6 denotes an AF sub mirror which leads a part of the light bundle from the photographing lens 1 to an AF module 7.

The finder optical system 3 comprises, in order from an object side to an image side along the optical path, a focusing screen 8 provided on a first image plane where a first image is formed by the photographing lens 1; a first condenser lens 9; a first mirror 10 which reflects a light bundle passed through the condenser lens 9 toward the front of the camera body; a second mirror 11 which reflects the light bundle from the first mirror 10 toward the top of the camera body; a relay system aberration correction lens 12 for forming a miniaturized virtual image nearer to the image side than to the focusing screen 8; a third mirror 13 which reflects the light bundle from the relay system aberration correcting lens 12 toward the rear of the camera body to be parallel to the optical axis of the photographing lens 1; a zoom relay lens system 14 used for pseudo zooming; a fourth mirror 15 which reflects the light bundle passed through the zoom relay lens system 14 toward the bottom of the camera body; a second condenser lens 16; a frame 17 provided on a second image plane where a second image is formed; a fifth mirror 18 which reflects the light bundle passed through the frame 17 toward the rear of the camera body to be parallel to the optical axis of the photographing lens 1; and a fixed eyepiece 19. A LCD (liquid crystal display device) 20 which composes displaying letters and such for a so-called in-finder display indicating information such as shutter speed and aperture value out of a field of view, an in-finder sub mirror 21 and an in-finder prism 22 are provided as shown in FIG. 2. 23 denotes a pupil.

In the embodiment, the main mirror and the first to fifth mirrors 10, 11, 13, 15 and 18 are used. Since the number of the mirrors is six (even number), a final finder image of an image to be taken is erect.

The zoom relay lens system 14 is composed of two lens units including three lens elements. In the zoom relay lens system 14, by shifting the lens elements with their relative positions changed according to a trimming magnification which is based on a pseudo zooming operation, an image magnification of the second image plane to the first image plane can be changed while the length between the first and second image planes is kept at a fixed amount.

Figure 14A:
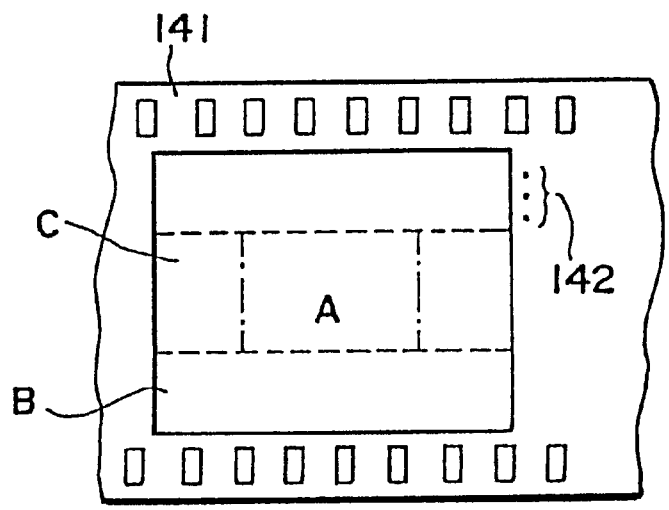
FIG. 14A and FIG. 14B are illustrations showing a trimming system.
Figure 14B:
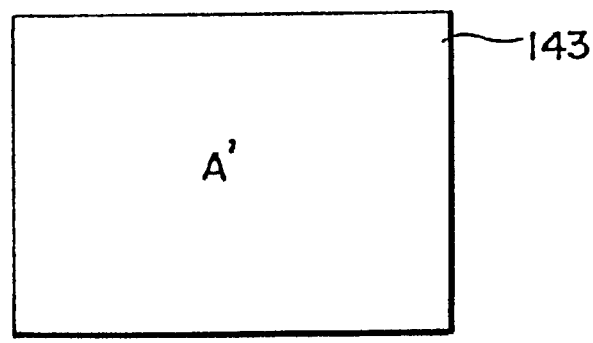

FIG. 14 shows a trimming system wherein a part of an image forming area of a film is trimmed to be enlarged in printing. In FIG. 14(A), when the whole of an image forming area B of the film 141 is a photographing area, the condition is defined as "WIDE". When an area A, which is a part of the area B is the photographing area, the condition is defined as "TELE". When the photographing area is between the areas B and C, the condition is defined as "MIDDLE". In the WIDE condition, the zoom relay lens system 14 is located where solid line lens elements show as shown in FIG. 2, and a range of the light bundle passing from the photographing lens 1 to the eyepiece 19 is shown by a solid line because the light bundle is cut off by the frame 17. In the TELE condition, the zoom relay lens system 14 is located where a broken line lens elements show, and the range of the light bundle is shown by a broken line. Therefore, the photographing area in WIDE is shown by the solid line on the film 141 and that of TELE is shown by the broken line on the film 141. In the MIDDLE condition, the zoom relay lens system 14 is located between the places where it is located in each of the WIDE and TELE conditions, and the photographing area is a certain size between WIDE and TELE (not shown).

In the embodiment of the present invention, the frame 17 for limiting a field of view is provided not on the focusing screen 8 of the first image plane but on the second image plane, and accordingly, the size of the frame limit member does not need to be changed in accordance with a pseudo zooming operation.

The relay zoom optical system (the relay system aberration correcting lens 12 and the zoom relay lens system 14) is a miniaturizing optical system, so that an image on the second image plane is a miniature of that of the first image plane and the optical path is also miniaturized. Furthermore, the relay zoom optical system can be small because the focal length of the eyepiece 19 is short to make the magnification the same as conventional finder optical systems.

Figure 1:
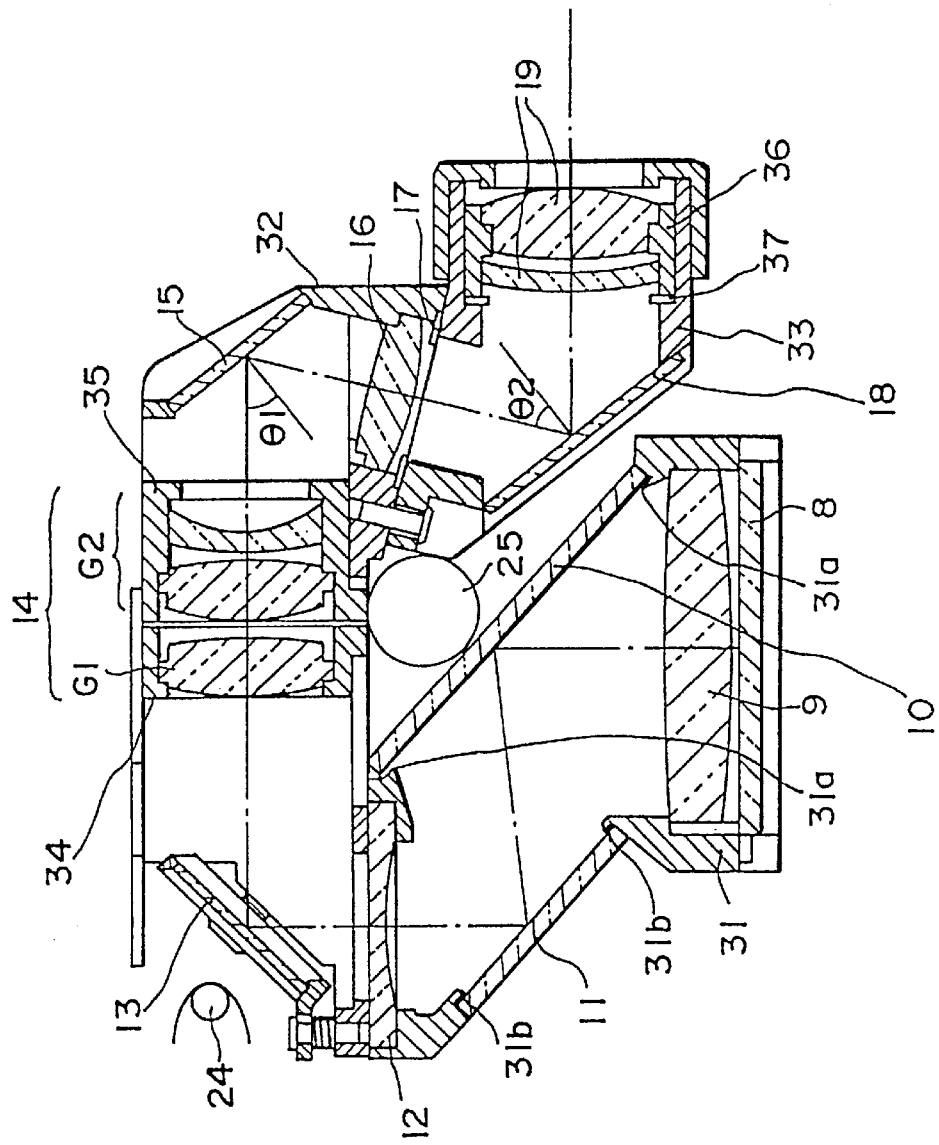
FIG. 1 is a sectional view of a viewfinder system of an embodiment of the present invention.

In the embodiment, the optical path is reflected by the fourth mirror 15 not vertically downward but obliquely a little as shown in FIGS. 1 and 2. Therefore, incident angles of the light path on the fourth and fifth mirrors 15 and 18 are less than 45°.

Between the third mirror 13 and the fourth mirror 15, a space for shifting the zoom relay lens system 14 is needed. The fourth mirror 15 is provided at the rear of the camera body for this reason. When the optical path is reflected vertically downward by the fourth mirror 15 and reflected toward the rear of the camera body by the fifth mirror 18, there is a much useless space between the first mirror 10 and the fifth mirror 15, and the eyepiece 19 projects to the pupil side.

To prevent these problems, in the present embodiment, as shown in FIG. 1, the incident angles $\theta 1$ and $\theta 2$ of the light path on the fourth and fifth mirrors 15 and 18 are set at less than 45° and the fifth mirror 18 is provided near the first mirror 10 without the useless space therebetween. That is, by setting the incident angle of the optical path on the fourth mirror 15 at less than 45°, the light bundle is reflected toward the first mirror 10, and in order to further reflect the light bundle, the fifth mirror 18 is provided just behind the first mirror 10. When the incident angle of the optical path on the fifth mirror 18 is set at less than 45°, the light bundle is reflected toward the pupil side and the fifth mirror 18 can be provided near and along the first mirror 10. At the same time, the eyepiece 19 is also able to be provided near the first mirror 10, so that it does not project to the pupil side. Thus, it is possible to make the viewfinder system small as a unit.

Figure 15:
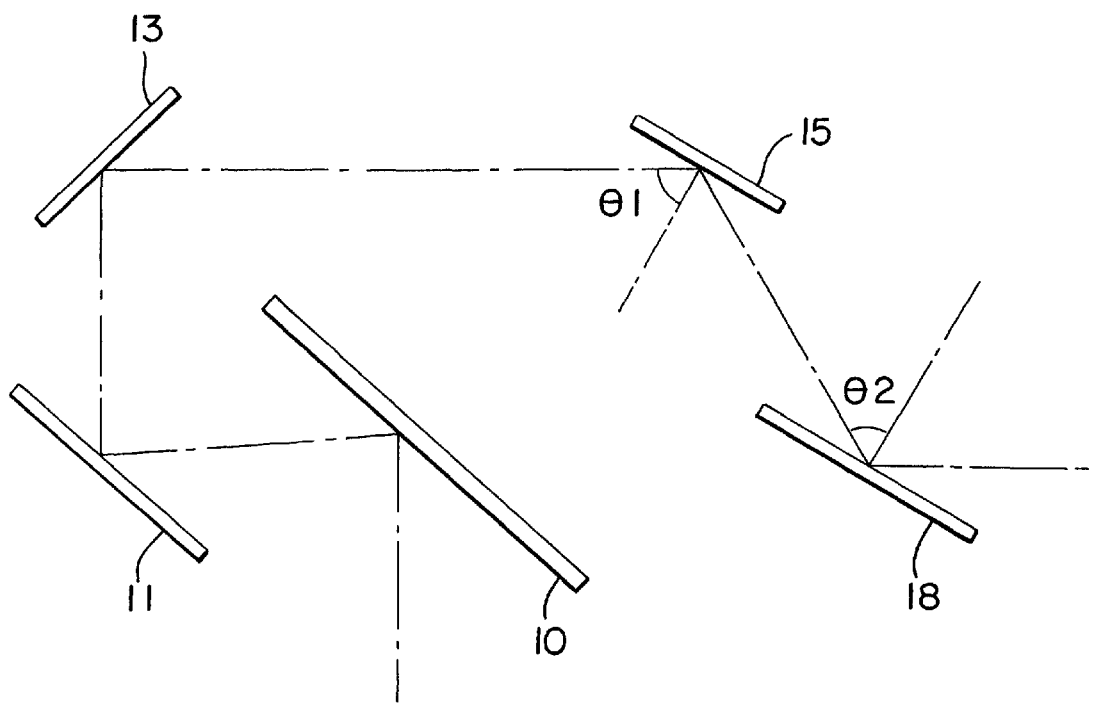
FIG. 15 is an illustration showing an arrangement of reflecting mirrors when incident angles θ1 and θ2 of the optical axis on the fourth mirror 15 and the fifth mirror 18 of a viewfinder system of the present invention are more than 45°.

FIG. 15 shows an arrangement of the first to fifth mirrors 10, 11, 13, 15 and 18 when the incident angles $\theta 1$ and $\theta 2$ are more than 45°. As shown in FIG. 15, when $\theta 1$ is more than 45°, the fifth mirror 18 can not be provided just behind the first mirror 10, and there is a much useless space between the first and fifth mirrors 10 and 18.

Behind the third mirror 13, a flashlight emitting member 24 is provided. And a flashlight condenser 25 is provided as shown in FIGS. 1 and 2.

A viewfinder system which performs a zooming operation according to the pseudo zooming is bigger than a conventional viewfinder system which does not carry out the zooming operation, for example, a viewfinder system using a pentaprism. If the viewfinder system has a flashlight device on its top, the height of the camera may become high.

However, in the embodiment of the present invention, since the flashlight emitting member 24 is provided behind the third mirror 13, namely, at a triangle space behind the third mirror 13, the viewfinder system does not become big in height and depth. Moreover, since the flashlight condenser 25 is provided at a space behind the first mirror 10, the camera can be prevented from being big in size.

Thus, by providing the flashlight emitting member 24 behind the third mirror 13 and the flashlight condenser 25 behind the first mirror 10, it is possible to make the total size of the viewfinder system and the flashlight device comparatively small.

Figure 16:
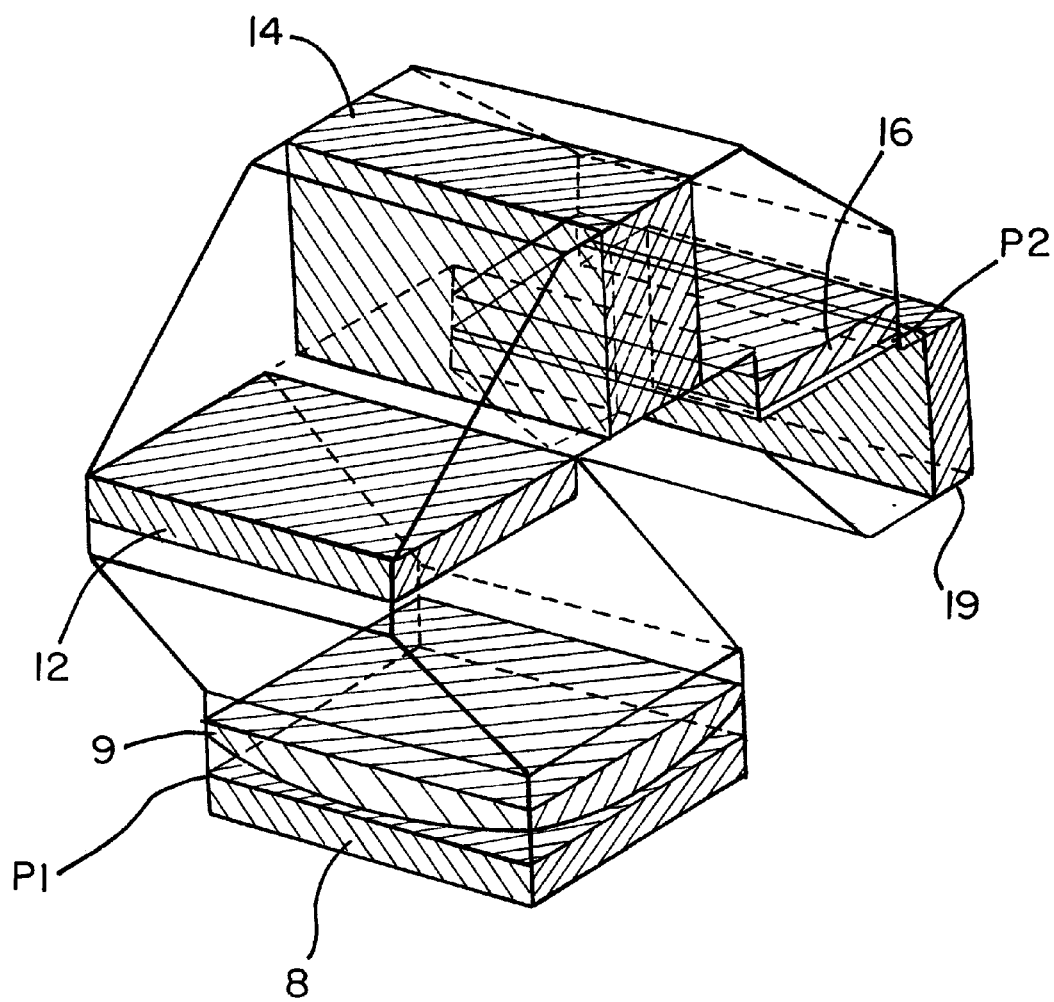
FIG. 16 is a perspective view of a viewfinder system of the embodiment in FIG. 1.

FIG. 1 shows a detailed structure of the viewfinder system using the relay zoom optical system. FIG. 16 is a perspective view of a viewfinder system of the embodiment in FIG. 1. The viewfinder system comprises an objective block 31, a zoom block 32 and an eyepiece block 33. The objective block 31 holds the focusing screen 8, the first condenser lens 9, the first mirror 10, the second mirror 11 and the relay system aberration correcting lens 12. The focusing screen 8, the first mirror 10, the second mirror 11, the relay lens aberration correcting lens 12 and the side surface of the objective block 31 form a sealed structure in order to prevent dust from sticking to the focusing screen 8 of the image forming plane.

The frame 17 is surrounded and sealed by the second condenser lens 16, the zoom block 32, the fifth mirror 18, the eyepiece 19 and the eyepiece block 33. Therefore, the second object image is formed in the sealed structure. The vicinity of the second object image is sealed, and the sealed structure prevents dust from breaking into the vicinity.

The zoom block 32 holds the third mirror 13, the zoom relay lens system 14, the fourth mirror 15 and the second condenser lens 16.

In the trimming mode, an area to be practically printed can be observed as a finder image by the zooming operation of the zoom relay lens system 14 as described above. And an information recording device 26 (shown in FIG. 2) records trimming information on a film by an optical, magnetic or another way and reads the information in printing, so that the area observed through the viewfinder system in photographing can be printed.

The zoom relay lens system 14 comprises in order from an object side, a first lens unit G1 comprising a positive biconvex lens element and a second lens unit G2 consisting of a positive biconvex lens element and a negative meniscus lens element. The first and second lens units G1 and G2 are fixed on lens holders 34 and 35.

Figure 3:
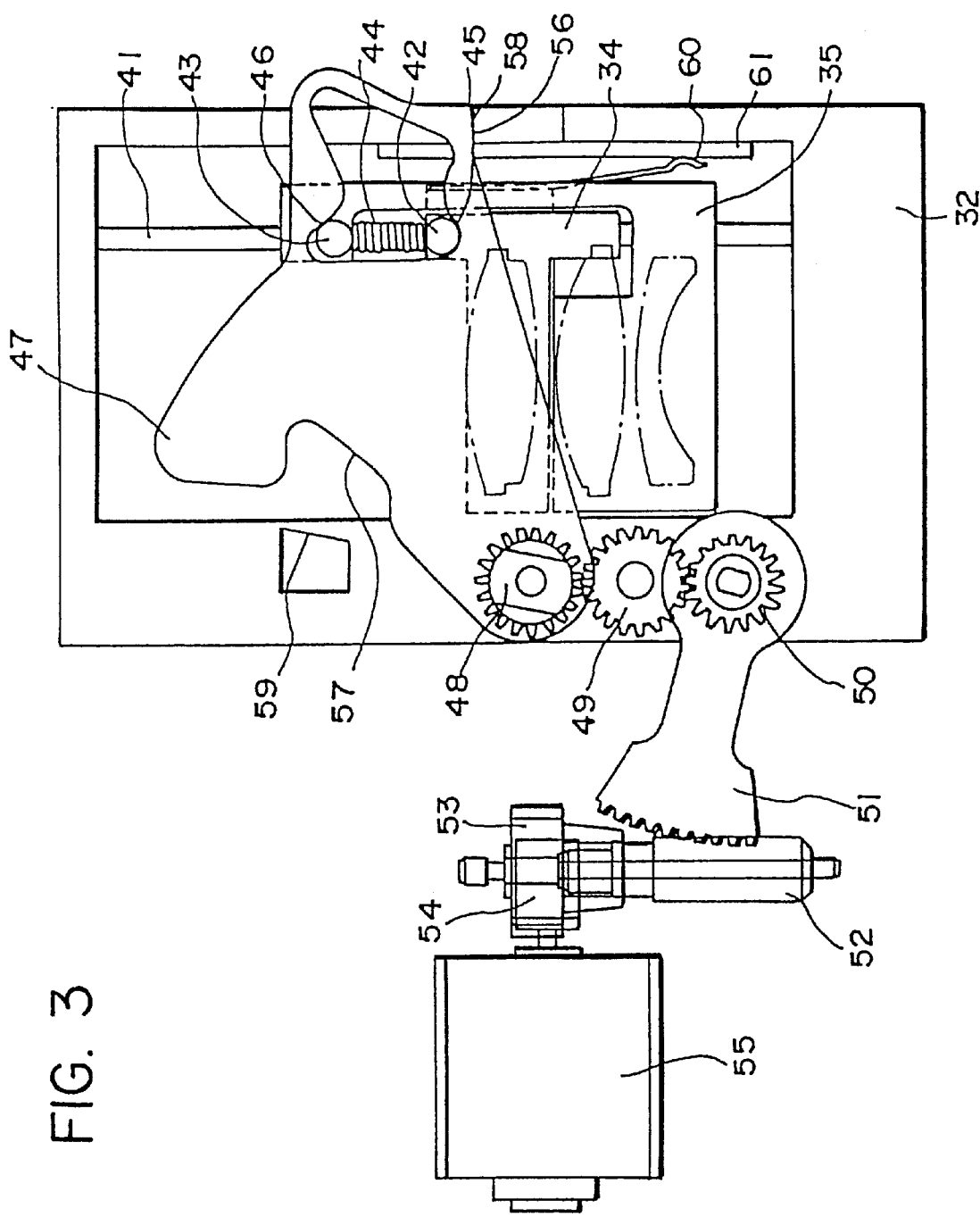
FIG. 3 is a plan view of a zoom relay lens driving system of an embodiment of the present invention in a WIDE condition.
Figure 4:
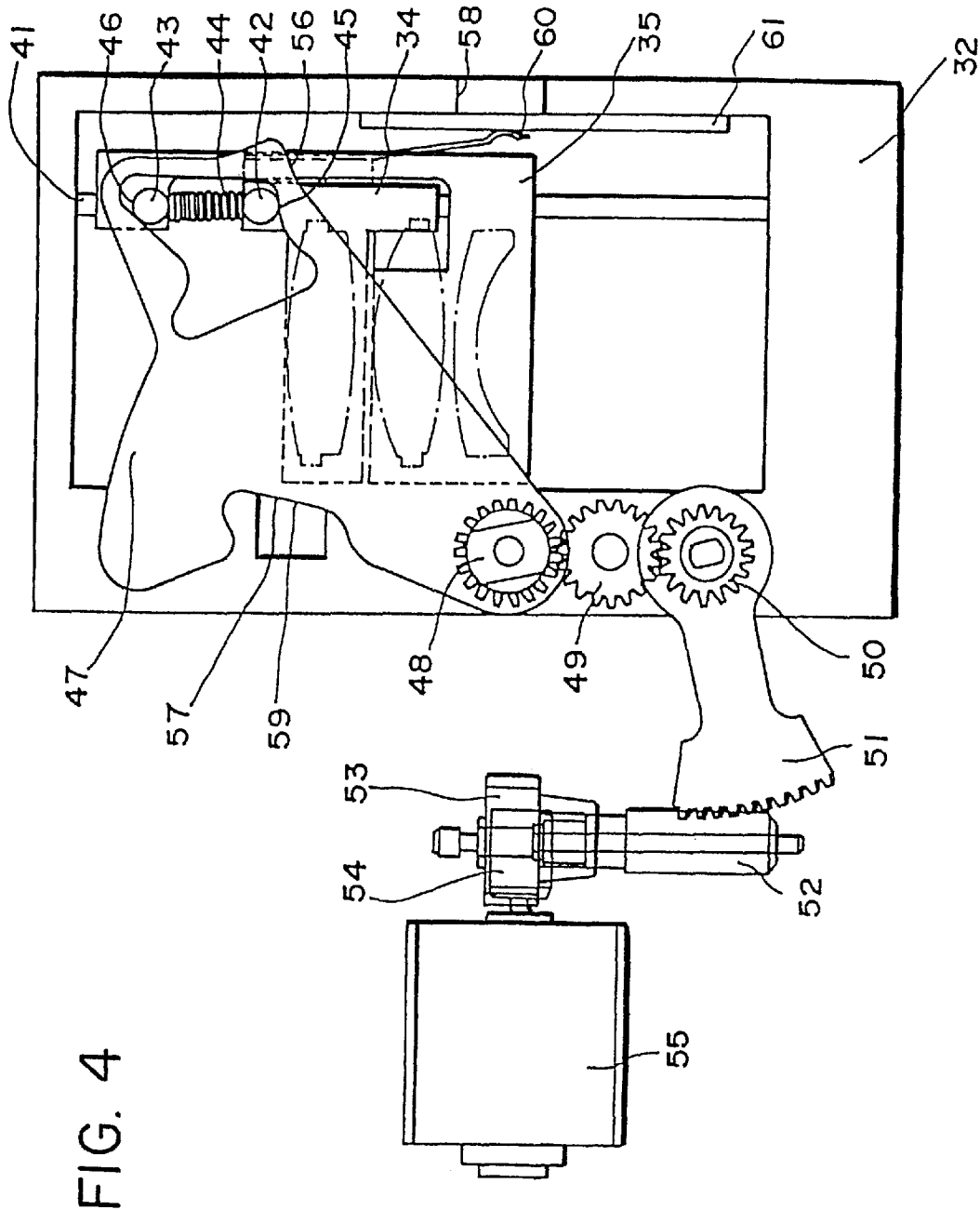
FIG. 4 is a plan view of a zoom relay lens driving system of an embodiment of the present invention in a TELE condition.

A mechanism of driving of the zoom relay lens system 14 is described hereinafter with reference to FIGS. 3 and 4. FIG. 3 shows the zoom relay lens driving system in the WIDE condition, and FIG. 4 shows that of the TELE condition. The lens holders 34 and 35 shift along a guide bar 41 only back and forth. Pins 42 and 43 respectively provided on the lens holders 34 and 35 are urged by a spring 44 and contacted cam surfaces 45 and 46, respectively. The lens holders 34 and 35 are located according to the positions of the pins 42 and 43. A cam plate 47 having the cam surfaces 45 and 46 are driven by a motor 55 through gears 48, 49, 50, 51, 52, 53 and 54. The gears 52 and 54 are worm gears for reducing the speed. At the both ends of the zooming range, surfaces 56 and 57 of the cam plate 47 are respectively contacted projections 58 and 59 provided on the zoom block 32, so that a precise image magnification can be achieved. On the lens holder 34, a segment 60 is fixed in order to detect a zooming position by electrically connecting the segment 60 with a pattern formed on an encoder substrate 61 fixed on the camera body. Therefore, an image magnification can be controlled by a micro computer as described later.

Generally, when a mirror is used in an optical path, the correspondence of the optical axes of the optical systems before and behind the mirror is difficult. The more the mirrors are used, the more difficult the correspondence tends to be. In the embodiment, in order to show a photographing area when a user observes an object through the viewfinder system, the frame 17 shown in FIGS. 1 and 2 is located on the second image plane. However, when the optical axes do not correspond, the photographing area shown by the frame 17 deviates on the focusing screen 8 vertically to the optical axis. Then, the incorrect photographing area is shown.

To correct the difference of the optical axes, there are two means. One is to shift the frame 17 vertically to the optical axis, and the other is to adjust an angle of one reflecting mirror provided between the focusing screen 8 and the frame 17 in the optical path.

The frame 17 has a panorama switching structure as described later. For shifting the frame 17, the panorama switching structure also has to be shifted together. Consequently, the former mean that is to shift the frame 17 is not proper.

Concerning the latter mean that is to adjust an angle of a reflecting mirror, its effect depends on which mirror is used for adjusting. When a reflecting mirror provided near the first or second image plane is used, the shifting amount of the optical axis to be corrected is little compared with the changing amount of the angle of the mirror. Therefore, to correct the difference of the optical axes, the changing amount of the angle of the reflecting mirror has to be much. Then, the reflecting mirror needs much space for shifting to change its angle. Since the relay zoom optical system is a miniaturizing optical system as described before, the first mirror 10 provided near the first image plane is biggest in size among the mirrors used in the relay zoom optical system, and the shifting amount of the optical system corrected by changing the angle of the mirror according to a magnification is the least.

Especially when the first mirror 10 near the first image plane is used, the shifting amount of the first mirror 10 for changing its angle becomes much, so that the first mirror 10 needs considerable much space for shifting. Moreover, in this case, an object observed through the viewfinder system tends to be partially out of focus.

In the embodiment of the present invention, the third mirror 13 provided just before the zoom relay lens system 14 is used for adjusting. The third mirror 13 is provided far from both of the focusing screen 8 and the frame 17 and its shifting amount for changing the angle is little. Furthermore, an object observed through the viewfinder system is partially out of focus hardly. The third mirror 13 is small in size compared with the other mirrors and is provided at the front in the finder optical system 3, so that it can be easily adjusted.

Figure 5A:
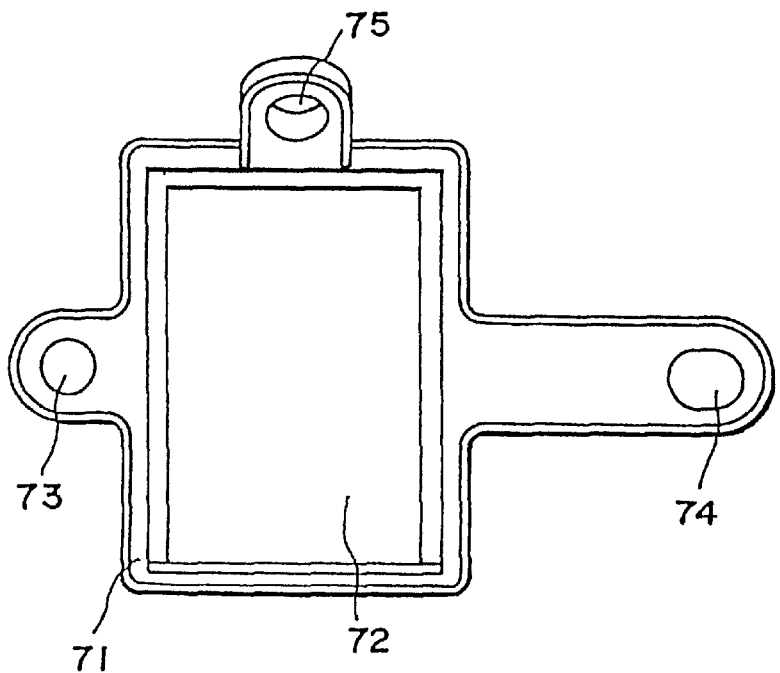
FIG. 5A and FIG. 5B are illustrations showing the way of adjustment of the third mirror in an embodiment of the present invention.
Figure 5B:
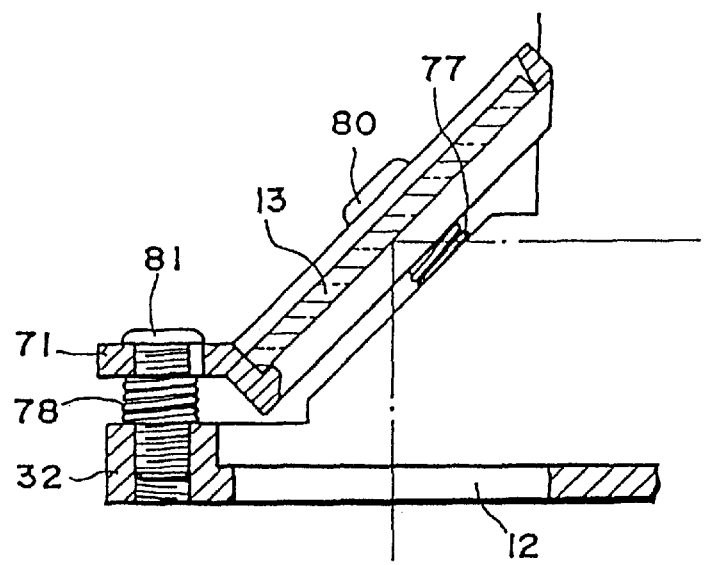

The above mentioned adjustment is described hereinafter with reference to FIG. 5. FIG. 5(A) shows a holder 71 of the third mirror 13. The holder 71 has an opening 72 in the middle, screw holes 73 and 74 on the both sides, and a screw hole 75 on the bottom. In the opening 72, the third mirror 13 is fixed. The holder 71 is fixed on the zoom block 32 with three screws which are fitted into the screw holes 73, 74 and 75 through springs respectively, as shown in FIG. 5(B). Springs 77 and 78 and screws 80 and 81 are corresponding to the screw holes 74 and 75, respectively, and the screw hole 73 is corresponding to the other spring and pin which are not shown in FIG. 5. Each screw is adjusted so that the optical axis of the light bundle lead upward from the relay system aberration correcting lens 12 should correspond with that of the zoom relay lens system 14.

In the embodiment, by fixing the two reflecting mirrors to the objective block 31, an error in positions of the two mirrors can decrease so as to reduce difference between the above mentioned optical axes. As shown in FIG. 1, the objective block 31 has a fitting portion 31a for the first mirror 10 and a fitting portion 31b for the second mirror 11. The objective block 31 is molded, and the fitting portions 31a and 31b are provided to keep the high precision in their locating relation. Therefore, the first mirror 10 and the second mirror 11 can be fitted to the block 31, keeping the precise locating relation.

As described above, a viewfinder system of the embodiment of the present invention has a plurality of reflecting members such as the first mirror 10 in the optical path and a holding member such as the objective block 31 for holding the first mirror 10 and the second mirror 11 together which are provided parallel.

Figure 6:
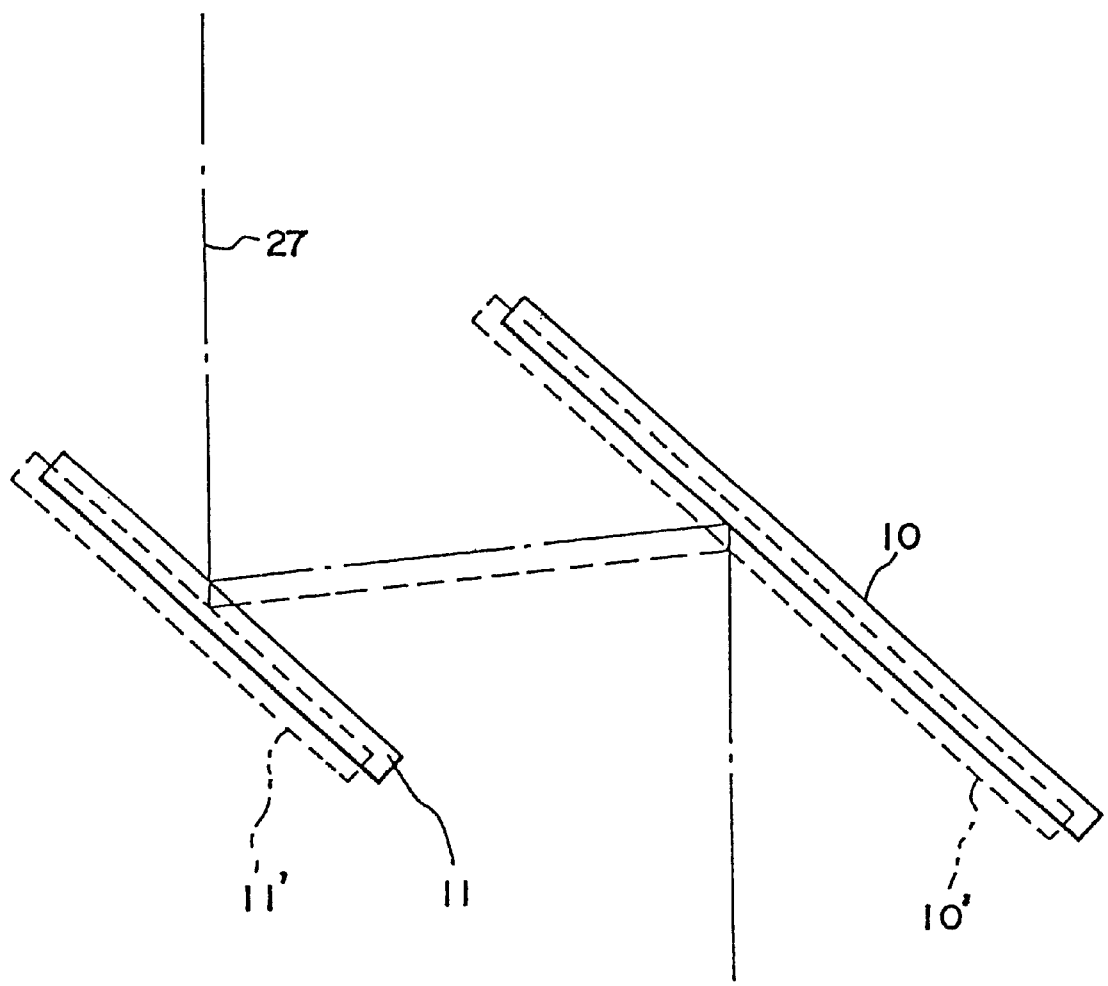
FIG. 6 is an illustration showing a relation between the first and second mirrors and the optical axis in the present invention.

FIG. 6 is an illustration showing an optical relation between the first and second mirrors 10 and 11. When the object block 31 shifts toward the front of the camera body with the locating relation between the two mirrors kept, the first mirror 10 shifts to 10' and the second mirror 11 shifts to 11', but an optical axis 27 reflected at the second mirror 11 after the first mirror 10 does not shift. Though in FIG. 6, the first mirror 10 is fully parallel to the second mirror 11, if an angle between the two mirrors is within a certain degree, the optical axis 27 hardly shifts. Thus, when two reflecting surfaces provided side by side and almost parallel in the finder optical path are held precisely, the optical axis shifts little even if an objective block holding the two reflecting surfaces shifts a little in fitting.

In the embodiment, the fourth mirror 15 and the fifth mirror 18 are held by different blocks as shown in FIG. 1. Since these mirrors are side by side and parallel in the finder optical path, the effect by holding them in one block can be similar to the effect by holding the first and second mirrors.

As show n in FIG. 1, the eyepiece block 33 holds the fifth mirror 18 and the eyepiece 19. A holder 36 of the eyepiece 19 is fixed to the eyepiece block 33 through a washer 37. By changing the thickness of the washer 37, the diopter can be adjusted. In FIG. 1, a structure of the in-finder display is omitted.

Figure 17:
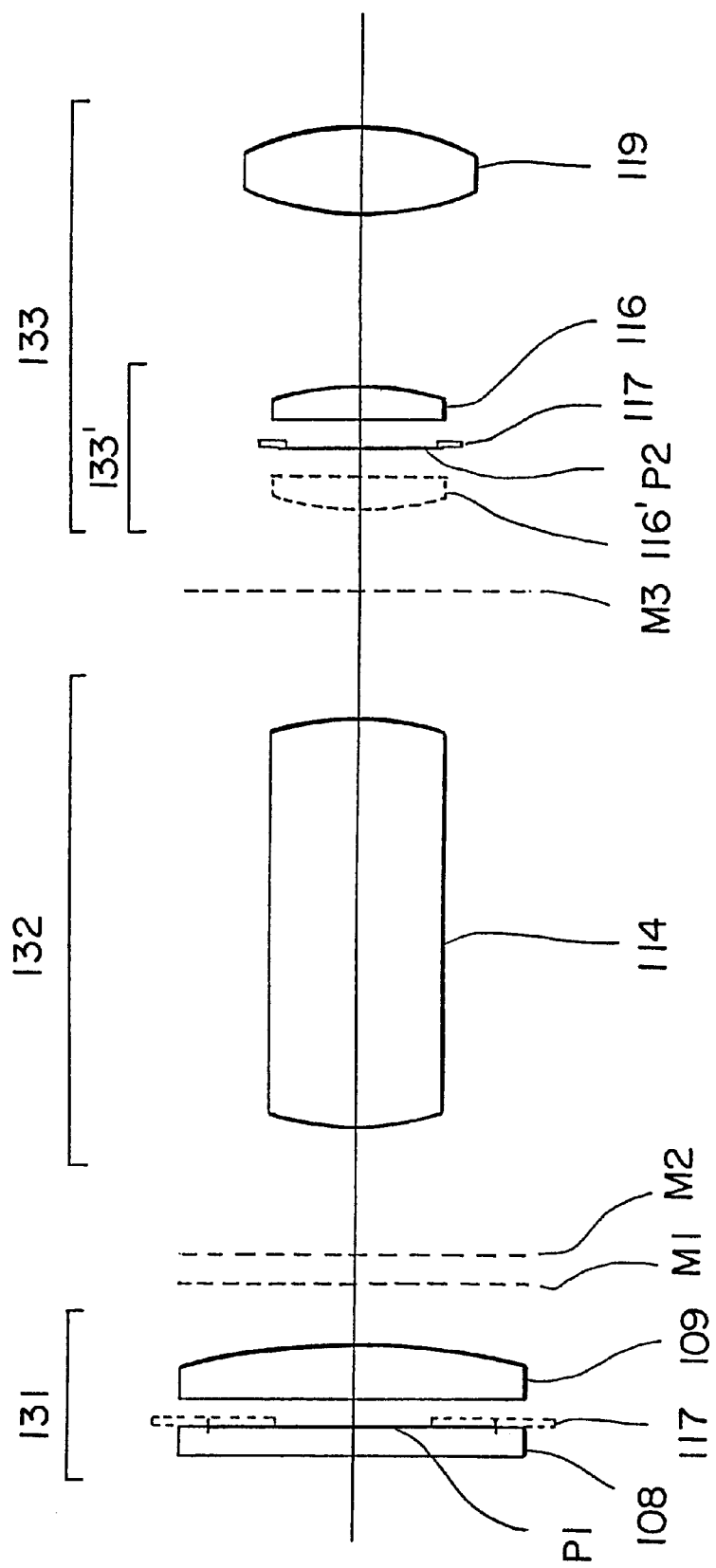
FIG. 17 is an illustration which explains the principle of the relay optical system.
Figure 18:
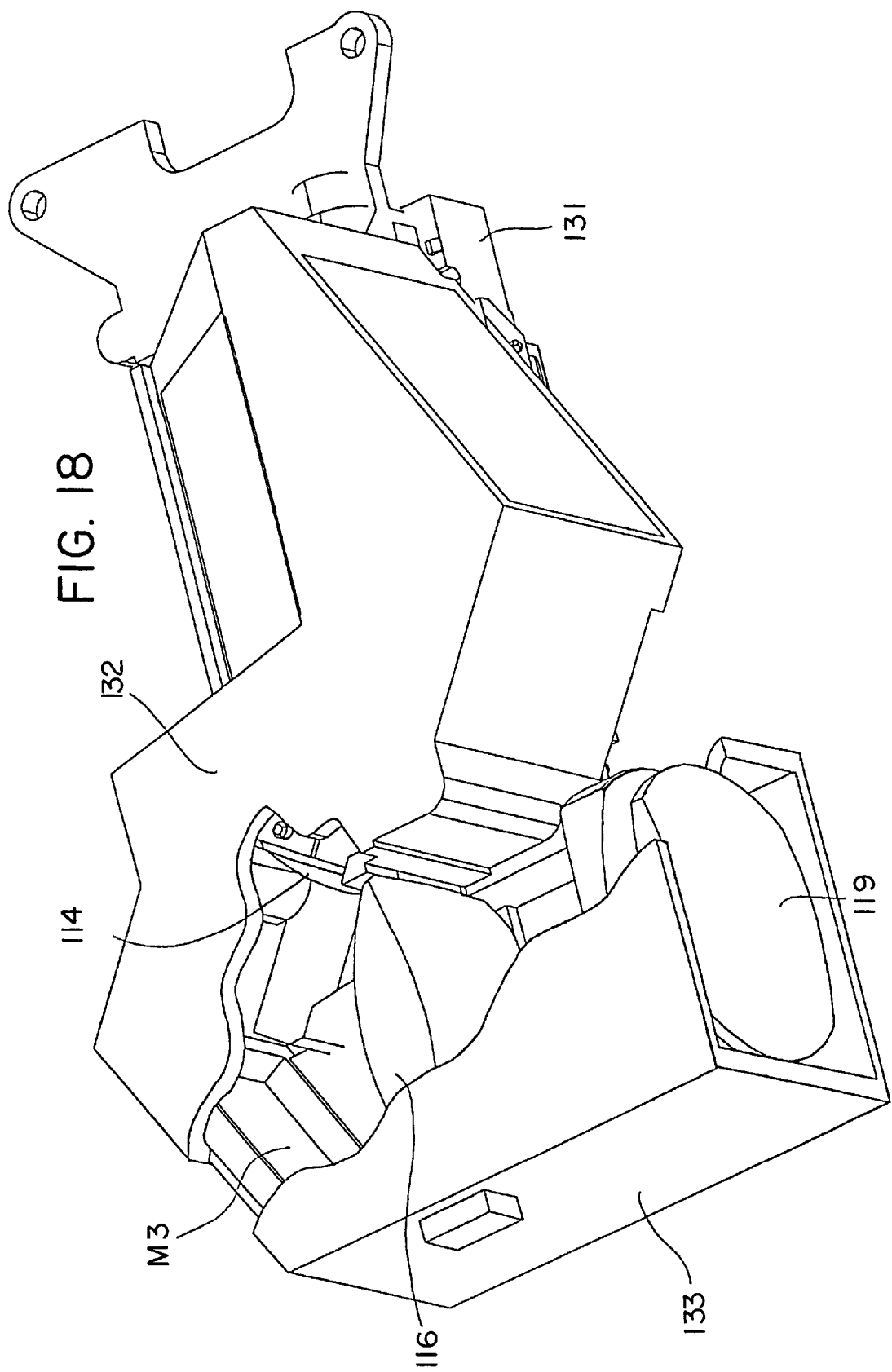
FIG. 18 is a sectional view illustration of a viewfinder system of another embodiment.
Figure 19:
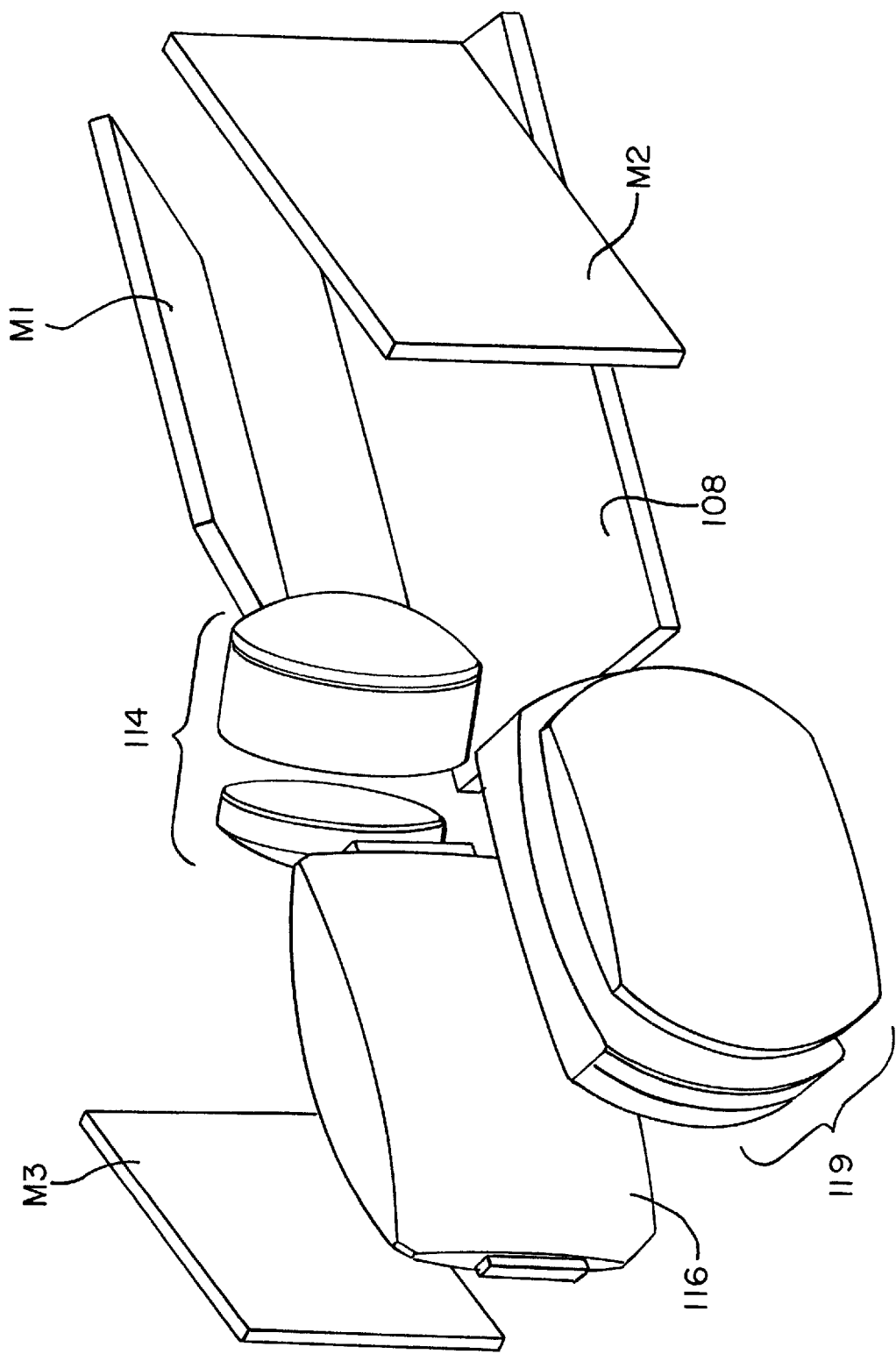
FIG. 19 is a sectional view illustration of a viewfinder system showing only optical elements of the embodiment in FIG. 18.

FIGS. 17, 18 and 19 show another embodiment of the present invention. A relay optical system of this embodiment comprises an objective block 131, a zoom block 132 and an eyepiece block 133. The objective block 131 holds a focusing screen 108 and a condenser lens 109. The zoom block 132 holds a zoom relay lens system 114. The eyepiece block 133 holds a second object image block 133' including a condenser lens 116 and an eyepiece 119. The second object image block 133' may be arranged in the zoom block 132 instead of the eyepiece block 133.

The first object image is formed on the eyepiece side of the focusing screen 108. The second object image is formed from the first object image through a first reflecting member M1, a second reflecting member M2, the zoom relay lens system 114 and a third reflecting member M3. When the focusing screen 108 has a Fresnel plane, the Fresnel plane may be substituted for the condenser lens 109.

The second object image is formed on a frame 117 which is surrounded and sealed by the second condenser lens 116, the zoom block 132, the third mirror M3, the eyepiece 119 and the eyepiece block 133.

The condenser lens 116 is may be arranged on either side 116 or 116' of the second object image plane p2. The second object image is observed through the eyepiece 119. A reflecting member may be arranged between the condenser lens 116 and the eyepiece 119.

All the reflecting surfaces above mentioned are arranged in order to make the whole size of the relay optical system small, therefore, all the reflecting surfaces are not always indispensable to the relay optical system.

The blocks 131, 132 and 133 are assembled firmly by sticking each other, so the whole relay lens optical system is formed as a sealed structure.

Figure 7A:
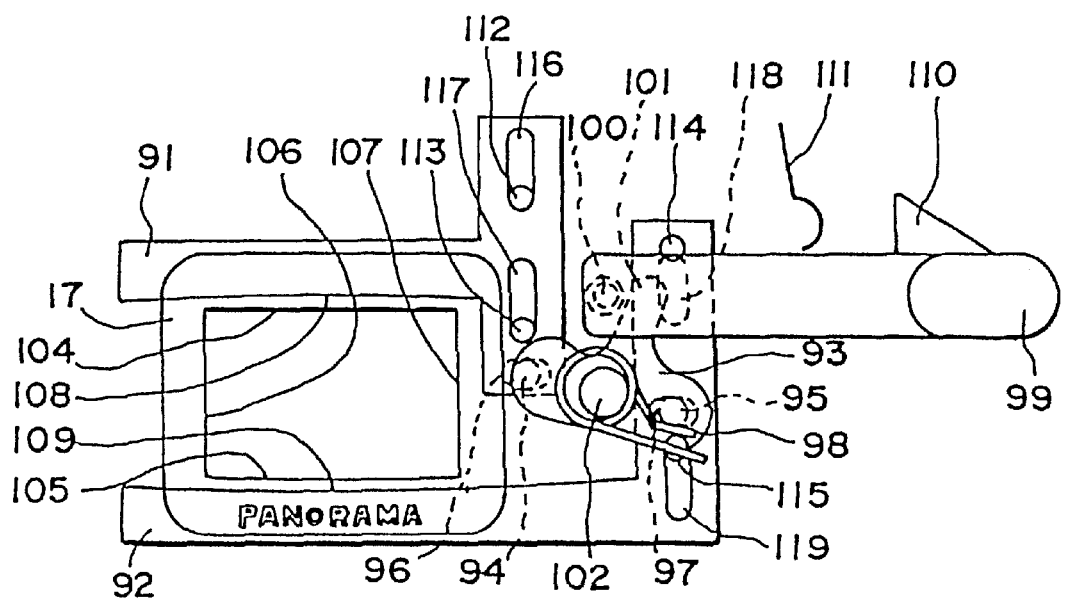
FIG. 7A and FIG. 7B are illustrations of a frame limit structure of an embodiment of the present invention.
Figure 7B:
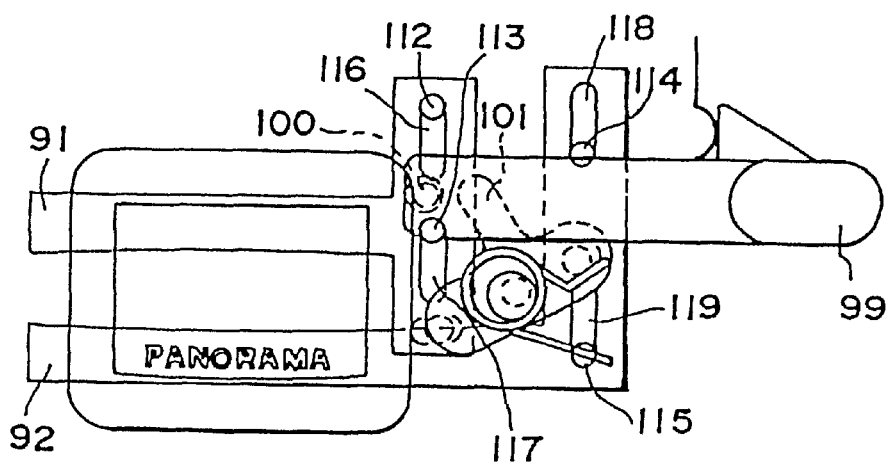

The frame 117 has a frame limit structure similar to the plates shown in FIGS. 7(A) and 7(B). The frame 117 may be located on other image planes, for example on the first image plane p1.

The objective block 31, the zoom block 32 and the eyepiece block 33 are fixed to the camera body 4 (shown in FIG. 2), the objective block 31 and the zoom block 32, respectively. Between the zoom block 32 and the eyepiece block 33, the frame 17 and a frame limit structure are provided.

FIG. 7 shows a frame limit structure provided near the frame 17. In the panorama mode photographing, it is desirable that an area observed through the viewfinder system corresponds with an area to be printed. In the panorama mode, the upper and lower parts of a field of view in the standard mode are shielded. In FIG. 7(A) showing a standard mode, the area observed through the viewfinder system is determined by the frame 17. Edges 104, 105, 106 and 107 of the frame 17 curve so that a photographer can observe the edges as straight lines. It is because the distortion of the eyepiece causes the curve of an image observed.

Long holes 116, 117, 118 and 119 of frame limit plates 91 and 92 provided near the upper and lower parts of the frame 17 are interlocked with pins 112, 113, 114 and 115, respectively. The frame limit plates 91 and 92 are able to move only up and down. In the panorama mode, the frame limit plates 91 and 92 move where FIG. 7(B) shows and the area observed through the viewfinder system is determined. Edges 108 and 109 of the frame limit plates 91 and 92 curve so that a photographer can observe the edges as straight lines like the edges 104 and 105. However, the degree of the curves are different because the edges 108 and 109 are located at different places from that of the edges 104 and 105. The edges 104, 105, 106, 107, 108 and 109 are parts of certain circles. The radius of one of the certain circles which includes the edges 108 and 109 as its arc is longer than that of another circle which includes the edges 104 and 105 as its arc.

Figure 8A:
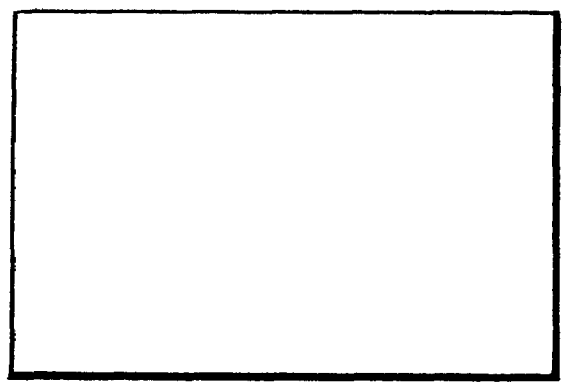
FIG. 8A and FIG. 8B are illustrations of a viewfinder system which is different according to an operation of the frame limit structure shown in FIG. 7.
Figure 8B:
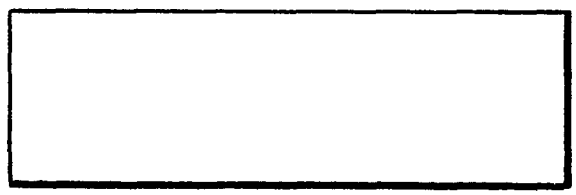

Mode display in the viewfinder system can be easy by putting a display such as "PANORAMA" on the frame limit plate and/or the frame limit plate 92. FIGS. 8(A) and(B) show a viewfinder system observed in the situations shown in FIGS. 7 (A) and(B). In the both situations, the distortion is corrected and the area observed through the viewfinder system is oblong. In the panorama mode (FIG. 8(B)), a display "PANORAMA" is indicated out of the field of view so as to let a photographer know that the mode is the panorama mode.

As shown in FIG. 7, pins 94 and 95 provided on driving lever 93 are fitted in long holes 96 and 97 of the frame limit plates 91 and 92. When the driving lever 93 turns, the frame limit plates 91 and 92 move up or down. The driving lever 93 turns on an axis 102 and is urged by a spring 98 counterclockwise, that is, in the direction that the frame limit plates shut. The turn of the driving lever 93 is stopped by contacting a lever 101 with a pin 100 provided on a operation lever 99. The operation lever 99 has a click (not shown) so as to stop at a place corresponding to each of the standard and panorama modes. In the panorama mode, as shown in FIG. 7(B), positions of the frame limit plates 91 and 92 are determined by contacting edges of the long holes 116, 117, 118 and 119 with the pins 112, 113, 114 and 115, and the pin 100 on the operation lever 99 does not contact with the lever 101. Therefore, in the panorama mode, even if the operation lever 99 is not located precisely, the frame limit plates 91 and 92 can be located precisely. On the operation lever 99, a segment 110 is provided. The segment 110 contacts with a segment 111 in the panorama mode to generate a panorama signal.

By using the frame limit plates 91 and 92, which are different members from the frame 17 used in the standard mode, in order to limit the field of view in the panorama mode, it becomes possible to limit the field of view with different shapes of the edges between the standard and panorama modes as described above. The stop positions of the moving frame limit plates 91 and 92 need a precision only in the panorama mode in FIG. 7(B). In the standard mode in FIG. 7(A), since the frame limit plates 91 and 92 are behind the fixed frame 17, the stop positions don't need a precision, so that the frame limit structure can be easily composed.

In the panorama mode, panorama information is recorded by the information recording device 26 (shown in FIG. 2) as well as in the trimming mode. The panoramic printing is performed by reading the information in printing.

Figure 9:
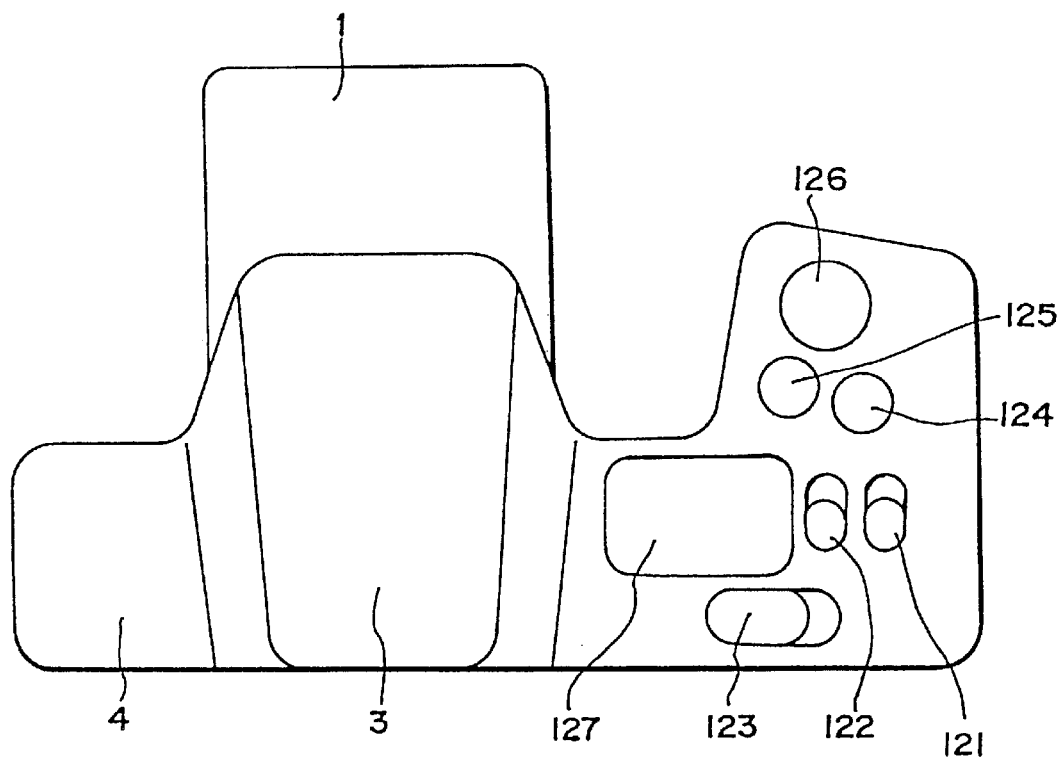
FIG. 9 is a plan view of a single reflex camera having a viewfinder system of an embodiment of the present invention.

FIG. 9 is a plan view of a camera having a viewfinder system of the present embodiment. In FIG. 9, 121 denotes a power switch. 122 denotes a mode switch of zooming operation of the viewfinder system for switching a continuous mode where the zooming operation is carried out continuously and a step mode where the zooming operation is carried out at plural points (in the embodiment, for example, three points of TELE, MIDDLE and WIDE) discontinuously. 123 denotes a panorama mode switch, 124 and 125 denote EZ (electronic zooming) keys used in the zooming operation of the viewfinder system, 126 denotes a shutter button, and 127 denotes a display board for displaying conditions of the camera. The panorama mode switch 123 is an operating portion of the operation lever 99 shown in FIG. 7.

Figure 10:
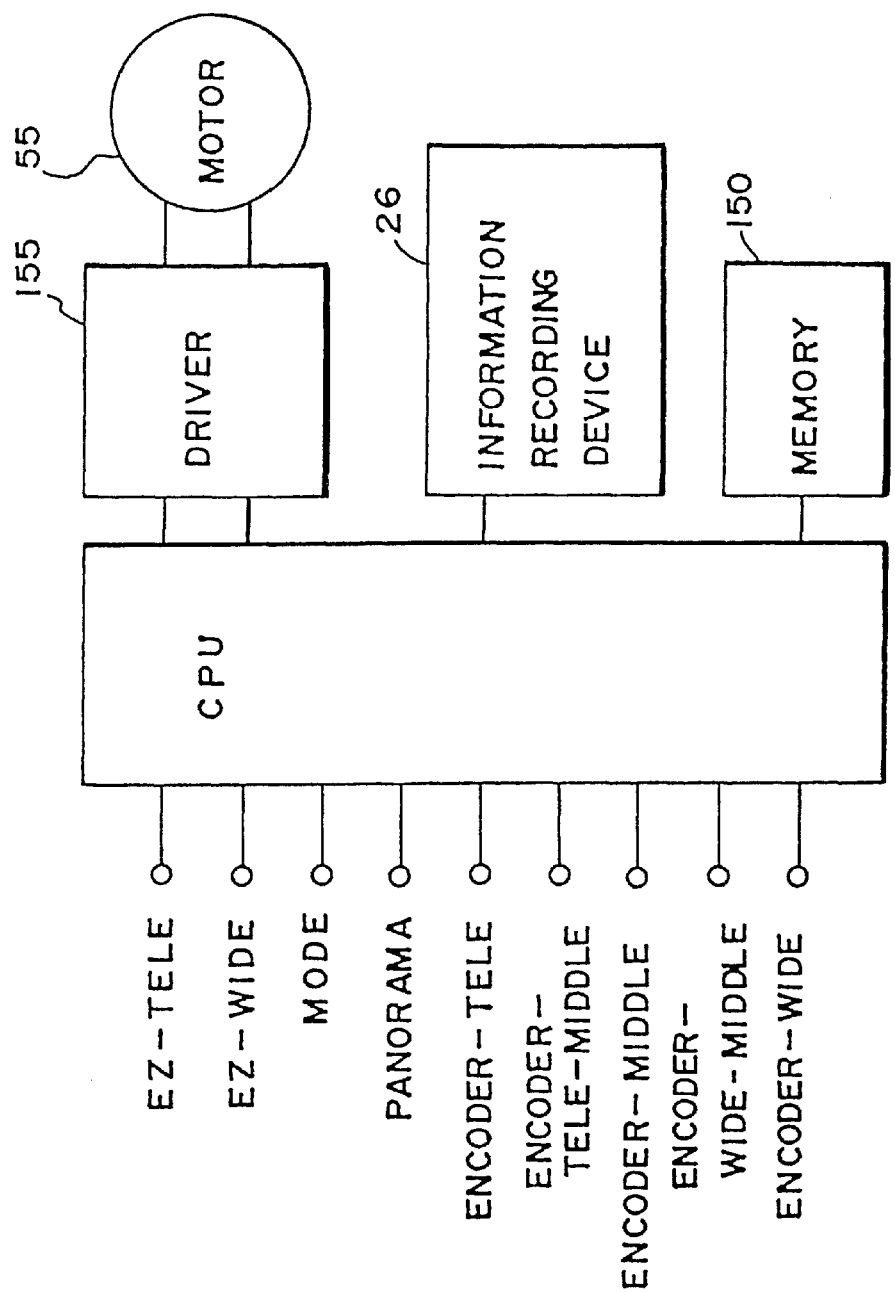
FIG. 10 is a block diagram of the camera shown in FIG. 9.

FIG. 10 is a block diagram of the camera shown in FIG. 9. In FIG. 9, EZ-TELE and EZ-WIDE signals are generated by the EZ keys 124 and 125, a MODE signal is generated by the mode switch 122, and a PANORAMA signal is generated by the panorama mode switch 123. Each signal of ENCODER-TELE, ENCODER-TELE-MIDDLE, ENCODER-MIDDLE, ENCODER-WIDE-MIDDLE, and ENCODER-WIDE is generated from an encoder substrate 61 (in FIGS. 3 and 4). When the zoom relay lens system 14 (in FIGS. 1 and 2) is located at TELE, between TELE and WIDE, at MIDDLE, between WIDE and MIDDLE, or at WIDE, the signal corresponding to each condition is generated.

Figure 11:
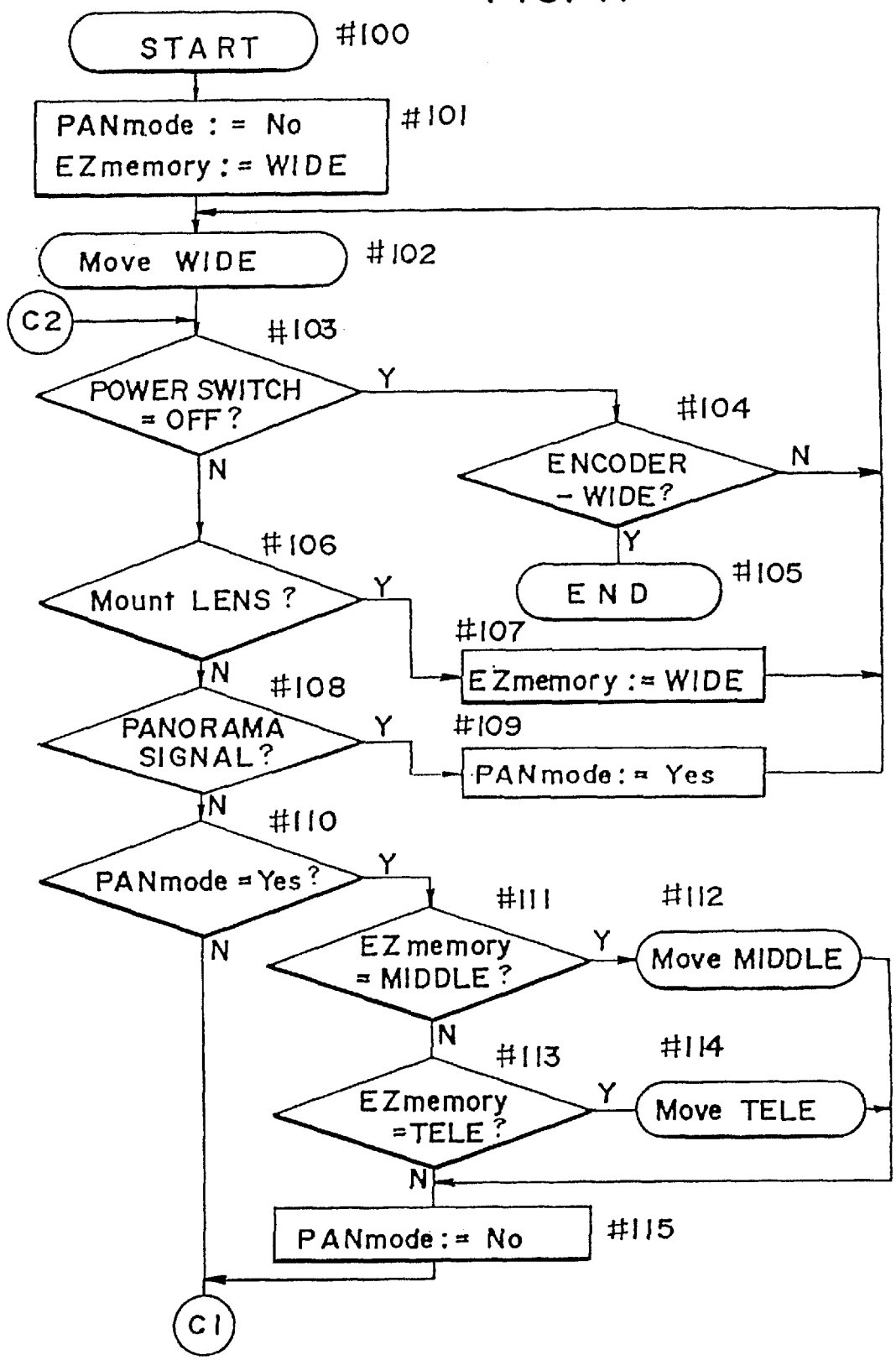
FIG. 11 is a flowchart showing a sequence of program steps of a camera of the present invention.
Figure 12:
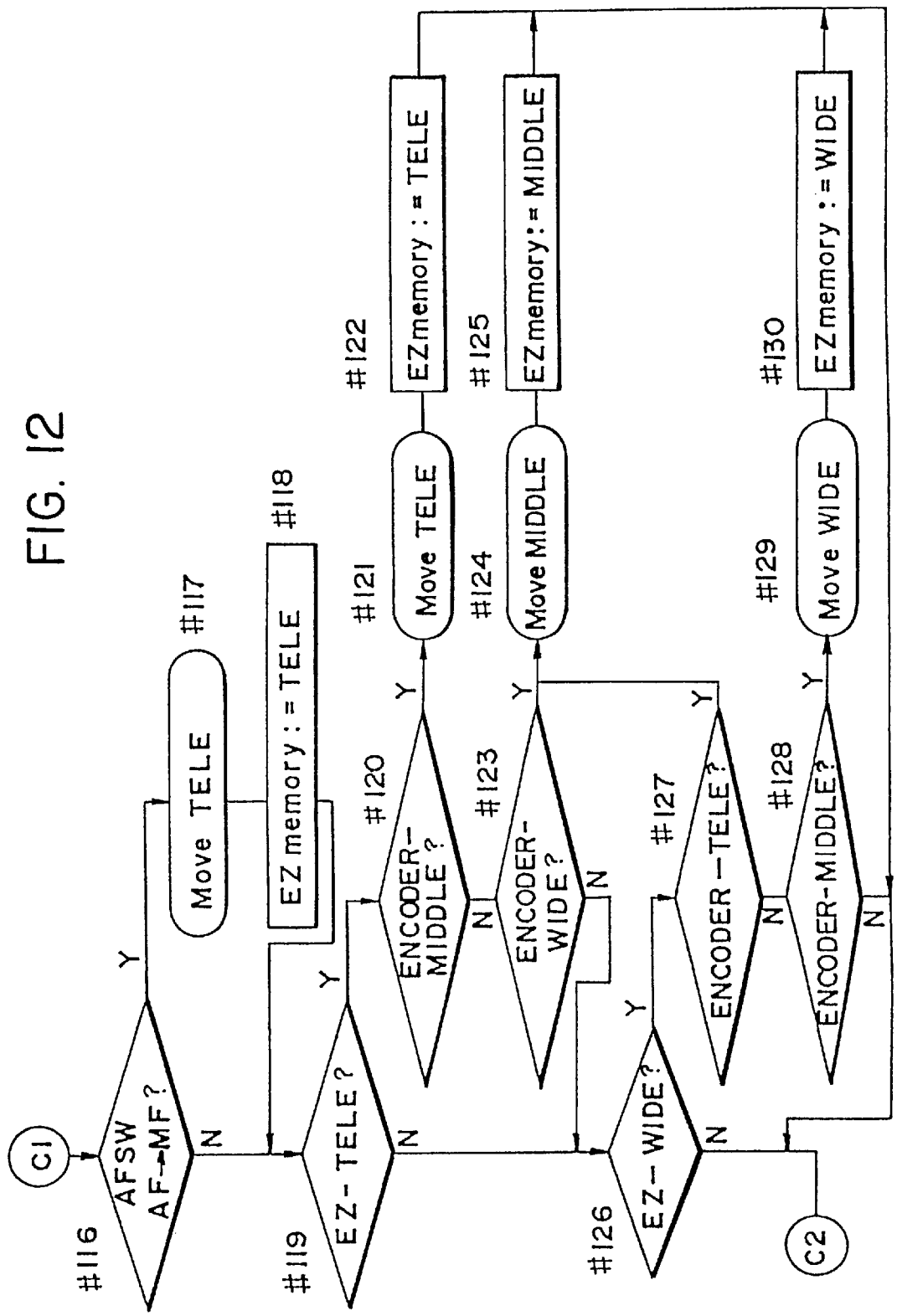
FIG. 12 is a continuation of the flowchart of FIG. 11 showing a sequence of program steps of a camera of the present invention.

FIGS. 11 and 12 are flowcharts showing a sequence in a step mode of a camera of the present invention.

When the power switch 121 in FIG. 9 is ON, the flowchart starts from a step #100. PANmode and EZmemory in step #101 are information to be recorded in a memory 150 shown in FIG. 10, and they are initialized when the power switch 121 turns ON.

In step #102, the finder zooming optical system is set at WIDE. Generally, right after the power switch 121 turned on, a photographer observes an object through the viewfinder system so as to perform framing. When the finder zooming optical system is set at WIDE, a photographer can observe wide area and perform framing easily.

A following routine to step #103 is repeated as an infinite loop when the power switch 121 is on. When the power switch 121 is detected to be OFF in the step #103, the program quits the infinite loop and starts finishing this routine. When the power switch 121 is OFF, the program goes to step #104. If the finder zooming optical system is not WIDE, the program goes through the steps #102 and #103 to #104 so as to make the finder zooming optical system WIDE, and ends the routine at the step #105. The finder zooming optical system is set at WIDE when the power switch 121 turns OFF, in order to prepare for the time when the power switch turns ON. Furthermore, when the finder zooming optical system is set at WIDE, a photographer can easily perform framing even before the power switch 121 turns ON.

In step #106, it is judged whether or not the photographing lens 1 (in FIG. 2) is mounted. When the photographing lens 1 is not mounted, the program goes through step #107 to the step #102 and the finder zooming optical system is set at WIDE. The program does not go to step #108 and the finder zooming optical system is kept being WIDE. It is to prevent the battery from being wasted by moving lenses in vain because of the operations of the EZ keys 124 and 125 (in FIG. 9). Moreover, when the finder zooming optical system is WIDE, a photographer can perform framing easily after the photographing lens 1 is mounted.

When the panorama mode switch 123 shown in FIG. 9 is set at the panorama mode, the field of view is changed according to the panorama mode switch 123 so as to correspond to the panorama mode as shown in FIG. 7(B), and the PANORAMA signal (in FIG. 10) is generated. In the step #108, the finder zooming optical system is set at WIDE in accordance with the PANORAMA signal. The panorama mode switch 123 turns ON just before the field of view is completely changed. After the field of view is changed, the zooming operation is carried out. The time when the change of the field of view is finished can overlap with the time when the zooming operation starts. For example, the times can be same.

When the PANORAMA signal is ON, a flag PANmode which indicates panoramic photographing is set at Yes in step #109 and the finder zooming optical system is set at WIDE in the step #102. The program does not go to step #110, and the finder zooming optical system is kept being WIDE. In the embodiment, in order to show the photographing area in the panoramic photographing, the frame in connection with the panorama mode switch is required to be corresponded to the panoramic photographing and the finder zooming optical system has to be WIDE. Consequently, when the PANORAMA signal is ON, the EZ-TELE and EZ-WIDE signals (in FIG. 10) generated by depressing the EZ keys 124 and 125 (in FIG. 9) are ignored and the finder zooming optical system is kept WIDE.

When the panorama mode switch 123 is set at the standard mode, the frame is for the standard photographing as shown in FIG. 7(A) and the PANORAMA signal turns OFF. The program goes from the step #108 to step #110.

When the PANORAMA signal is ON, after the PANmode is set at Yes in the step #109, the PANORAMA signal turns OFF and the program goes to the step #110 where the flag is Yes. Then, according to the information recorded in the EZmemory, the lenses are shifted from WIDE to MIDDLE or TELE in steps #111 and #113. The EZmemory records a condition of the finder zooming optical system which is just before the PANORAMA signal turns ON. Therefore, after the mode is changed from the panorama mode to the standard mode, the panorama mode switch 123 can be set at the same condition as just before the panorama mode is set.

Thus, in the case that the mode is changed from the standard mode to the panorama mode under the TELE condition, the panorama mode switch 123 is set at the panorama mode, the frame is changed so as to correspond to the panoramic photographing, and the finder zooming optical system is also changed from TELE to WIDE, in accordance with the PANORAMA signal, and accordingly, the area to be photographed in the panorama mode can be observed correctly. Then, when the panorama mode switch 123 is set at the standard mode again, the frame is changed so as to correspond to the standard photographing and the finder zooming optical system is changed to TELE again at once without depressing the EZ key.

In FIG. 12, steps #116 to #118 show a routine where the finder zooming optical system is shifted to TELE when an auto-focus switch is changed from an auto-focus (AF) mode to a manual focus (MF) mode. When a photographer changes the auto-focus switch to the MF mode, he focuses his camera manually, observing an object through the viewfinder system. Therefore, the finder zooming optical system is set at TELE because the finder magnification is high and the object is easily in focus. The following routine to step #119 is to shift the finder zooming optical system in accordance with the EZ-TELE or EZ-WIDE signal generated when either the EZ key 124 or 125 in FIG. 9 is depressed. When the EZ-TELE signal is generated, the finder zooming optical system is shifted from MIDDLE to TELE or from WIDE to MIDDLE. If the finder zooming optical system is TELE, it is not shifted. When EZ-WIDE signal is generated, the finder zooming optical system is shifted from TELE to MIDDLE or from MIDDLE to WIDE. If the finder zooming optical system is WIDE, it is not shifted. After the finder zooming optical system is shifted in the steps #119 to #130, the program returns to the step #103 shown in FIG. 11 and repeats the same routine. "MoveWIDE", "MoveMIDDLE", and "MoveTELE" in FIGS. 11 and 12 are routines to shift the finder zooming optical system to WIDE, MIDDLE and TELE, respectively.

Figure 13:
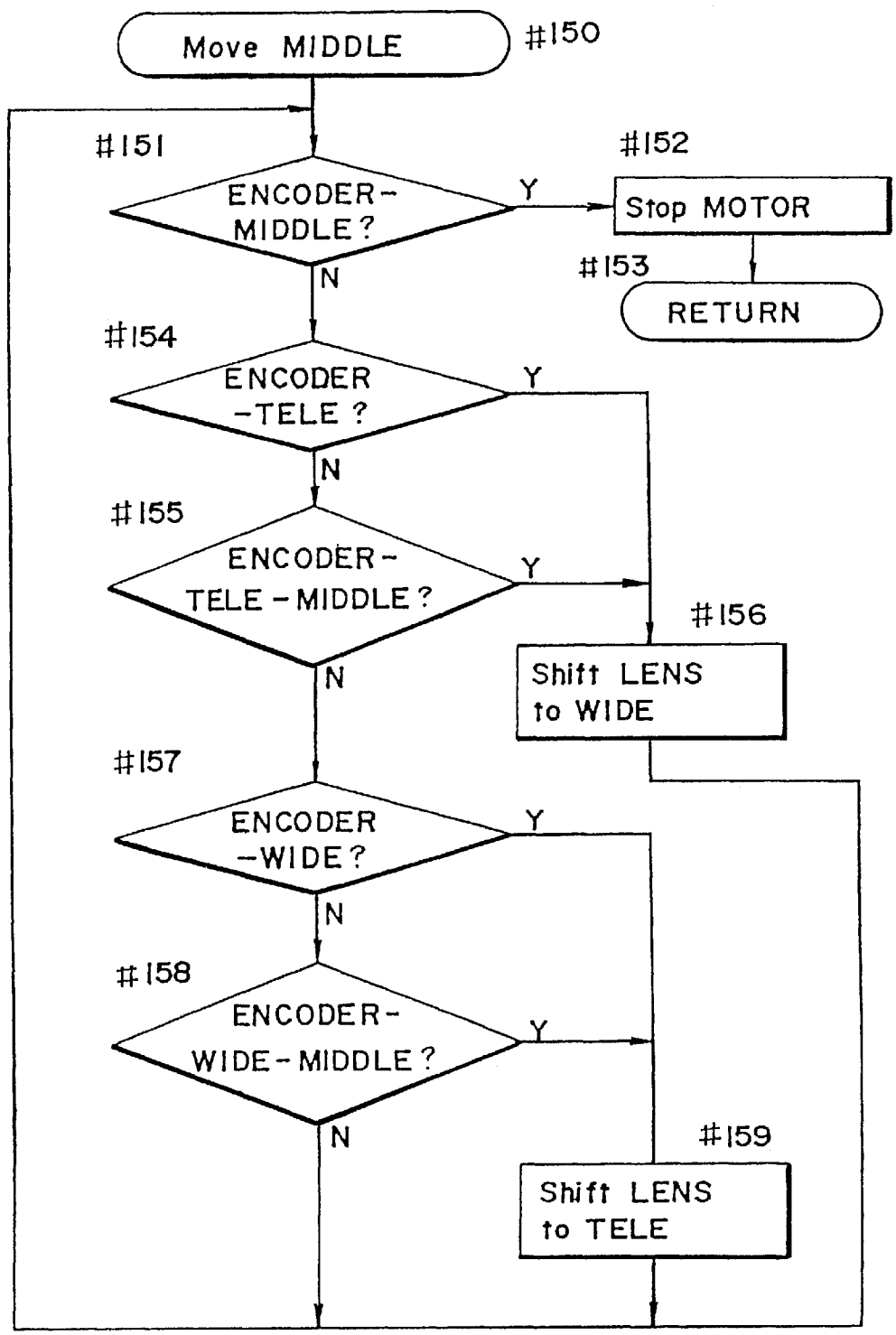
FIG. 13 is a flowchart of a "MoveMIDDLE" routine of flowcharts shown in FIGS. 11 and 12.

FIG. 13 shows the "MoveMIDDLE" routine. The encoder substrate 61 detecting the lens position, which is shown in FIGS. 3 and 4, detects which position the lenses are located at, either WIDE (where the ENCODER-WIDE signal is generated), MIDDLE (where the ENCODER-MIDDLE signal is generated) or TELE (where the ENCODER-TELE signal is generated) or either between WIDE and MIDDLE (where the ENCODER-WIDE-MIDDLE signal is generated) or between TELE and MIDDLE (where the ENCODER-TELE-MIDDLE signal is generated). In the "MoveMIDDLE" routine, if the ENCODER-MIDDLE signal is generated in step #151, the lenses have not to be shifted, so that a driver 155 and a motor 55 for shifting the lenses (in FIG. 10) are stopped in step #152, and the program returns to the main routine (in step #153).

When the encoder substrate 61 detects that the lenses are located at TELE or between TELE and MIDDLE by the ENCODER-TELE signal or the ENCODER-TELE-MIDDLE signal in steps #154 and #155, the lenses are shifted to WIDE in step #156 and the program repeats the steps until the ENCODER-MIDDLE signal is detected in the step #151.

When the encoder substrate 61 detects that the lenses are located at WIDE or between WIDE and MIDDLE by the ENCODER-WIDE signal or the ENCODER-WIDE-MIDDLE signal in steps #157 and #158, the lenses are shifted to TELE and the program repeats the steps until the ENCODER-MIDDLE signal is detected in the step #151.

In the continuous mode, the steps following to the step #110 in FIG. 11, which are for the case that the panorama mode is canceled, are omitted. And the following steps to the step #119 in FIG. 12 are changed to steps where the motor is driven to TELE when the EZ-TELE signal and any signal except the ENCODER-TELE are generated and where the motor is driven to WIDE when the EZ-WIDE signal and any signal except the ENCODER-WIDE are generated.

Otherwise, the encoder can be further subdivided. In this case, a sequence is not largely different from that of FIGS. 11 and 12.

The relay type TTL viewfinder system of the present invention also comprises: a focusing screen on which a first object image is formed; a relay optical system through which said first object image is formed as a second object image and where said second object image is formed smaller than said first object image; reflecting members disposed in said relay optical system to reflect light rays of said first object image; and means for moving one of said reflecting members except a reflecting member which is provided closest to said first object image, so as to adjust an angle of said light rays of said first object image to said reflecting members. Therefore, the difference of the optical axis can be corrected in small space without occurring the deterioration of optical characteristics such as partial out-of-focus, so that the relay type TTL viewfinder system can be small in size.

When the reflecting member moved by the above mentioned means is not provided nearest to the second image plane on the object side, it requires smaller space to be moved, so that the relay type TTL viewfinder system can be further small in size.

Moreover, the viewfinder system of the present invention comprises: reflecting members disposed in an optical path in said optical device to reflect light rays traveling in said optical path, two of said reflecting members located parallel to each other; and holding means for holding said two of reflecting members to maintain said parallel relation in locating. Therefore, the relative positions of the above mentioned two reflecting members can be determined precisely, and it can be possible to provide a viewfinder system where the optical axis does not shift even if the holding member itself shifts because of the error in setting.

What is claimed is:

1. A viewfinder system of an optical device comprising:
   a focusing screen on which a first object image is formed by an objective lens system;
   a relay optical system through which said first object image is formed as a second image;
   an eyepiece block which holds an eyepiece optical system through which said second object image is observed;
   a reflection member which is arranged between the relay optical system, and the eyepiece optical system; and
   a holding member for holding the relay optical system;
   wherein a space surround by the relay optical system, the holding member, the eyepiece optical system and the eyepiece block is a sealed structure to prevent dust from entering inside the eyepiece block.

2. A viewfinder system of an optical device comprising:
   a focusing screen on which a first object image is formed by an objective lens system;
   a relay optical system through which said first object image is formed as a second object image;
   an eyepiece optical system through which said second object image is observed;
   a reflection member which is arranged between the relay optical system and the eyepiece optical system;
   a first holding member for holding the relay optical system;

a second holding member for holding the focusing screen; and wherein a space surrounded with focusing screen, the relay optical system, the first holding member and the second holding member is a sealed structure to prevent dust from entering the vicinity of said first object image.

3. A viewfinder system of an optical device according to claim 2, further comprising a reflecting member which is disposed between said first object image and said relay optical system.

4. A viewfinder system of an optical device according to claim 2, further comprising a condenser lens disposed in the vicinity of said focusing screen.

5. A viewfinder system of an optical device according to claim 2, wherein said relay optical system including a zoom relay optical system.

6. A viewfinder system of an optical device comprising:

a focusing screen on which a first object image is formed by an objective lens system;

a relay optical system through which said first object image is formed as a second object image;

an eyepiece optical system through which said second object image is observed;

a reflection member which is arranged between the relay optical system and the eyepiece optical system;

a holding member for holding the relay optical system; and an objective block which holds said focusing screen and wherein a space surrounded by the objective block, the relay optical system and the holding member is a sealed structure to prevent dust from entering the vicinity of said first object image.

7. A viewfinder system for use with an optical system providing a first object image, comprising:

an objective block means, which is sealed as a unit including a focusing screen for forming the first object image and relay optical components for transmitting the first object image, the sealed unit prevents dust from effecting the first object image;

a zoom block means, having a zoom optical system, for receiving and permitting a modification of a magnification of the first object image to provide a second object image;

means, extending into the zoom block means, for driving the zoom optical system to provide a modification of the magnification of the first object image; and an eyepiece block means for receiving the second object image from the zoom optical system including a reflecting member and an eyepiece through which the second object image is observed, the eyepiece block means is sealed and the second object image is realized within the sealed eyepiece block means.

8. The viewfinder system of claim 7 wherein an optical axis extending into the eyepiece block means is bent to form an angle of less than 90° by a reflecting member as it exits the eyepiece block means.

* * * * *